United States Patent
Hosseini et al.

(10) Patent No.: US 11,533,737 B2
(45) Date of Patent: *Dec. 20, 2022

(54) POST-PUNCTURE INDICATION FOR MOBILE BROADBAND AND LOW LATENCY COMMUNICATION MULTIPLEXING

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,658

(22) Filed: Aug. 24, 2020

(65) Prior Publication Data

US 2021/0045137 A1 Feb. 11, 2021

Related U.S. Application Data

(63) Continuation of application No. 15/704,389, filed on Sep. 14, 2017, now Pat. No. 10,757,718.

(Continued)

(51) Int. Cl.
*H04W 72/12* (2009.01)
*H04W 72/04* (2009.01)
*H04L 5/00* (2006.01)

(52) U.S. Cl.
CPC ....... *H04W 72/1226* (2013.01); *H04L 5/0064* (2013.01); *H04L 5/0096* (2013.01);

(Continued)

(58) Field of Classification Search
None
See application file for complete search history.

(56) References Cited

U.S. PATENT DOCUMENTS 8,385,268 B2 2/2013 Chen et al.
10,524,282 B2 12/2019 Tavildar et al.
(Continued)

FOREIGN PATENT DOCUMENTS

CN 103716144 A 4/2014
JP 2013527677 A 6/2013
(Continued)

OTHER PUBLICATIONS

Huawei, et al., "On DL Multiplexing of URLLC and eMBB Transmissions", 3GPP Draft; R1-1701663, 3rd Generation Partnership Project (3GPP), Mobile Competence Centre; 650, Route Des Lucioles; F-06921 Sophia-Antipolis Cedex; France, vol. RAN WG1, No. Athens. Greece; Feb. 13, 2017-Feb. 17, 2017, Feb. 12, 2017 (Feb. 12, 2017), XP051208830, 10 pages, Retrieved from the Internet: URL: http://www.3gpp.org/ftp/Meetings_3GPP_SYNC/RAN1/Docs/.

(Continued)

*Primary Examiner* — Scott M Sciacca
(74) *Attorney, Agent, or Firm* — Holland & Hart LLP

(57) ABSTRACT

Methods, systems, and devices for wireless communication are described. Some wireless communications systems support mobile broadband (MBB) communications and low latency communications. To accommodate low latency communications, a base station may identify resources allocated for MBB communications, and the base station may reassign (or puncture) these resources for low latency communications. The base station may transmit an indication of the reassigned (or punctured) resources to one or more user equipment (UEs). The base station may transmit an indication of the reassigned resources in a transmission time (Continued)

interval (TTI) that is subsequent to a TTI reassigned (or punctured) for low latency communications (e.g., a post indication). The base station may transmit the post indication in a retransmission grant of a physical downlink control channel (PDCCH) or in downlink control information (DCI) of a PDCCH.

28 Claims, 15 Drawing Sheets

Related U.S. Application Data

(60) Provisional application No. 62/460,084, filed on Feb. 16, 2017.

(52) U.S. Cl.
CPC ..... *H04W 72/042* (2013.01); *H04W 72/1278* (2013.01); *H04W 72/1289* (2013.01); *H04L 5/001* (2013.01); *H04L 5/0055* (2013.01)

(56) References Cited

U.S. PATENT DOCUMENTS

| | | | |
|---|---|---|---|
| 2015/0334685 A1 | 11/2015 | Ji et al. | |
| 2016/0234857 A1 | 8/2016 | Chen et al. | |
| 2017/0135084 A1 | 5/2017 | Kuchibhotla et al. | |
| 2017/0367046 A1 | 12/2017 | Papasakellariou | |
| 2018/0063865 A1* | 3/2018 | Islam | H04W 76/27 |
| 2018/0070341 A1 | 3/2018 | Islam et al. | |
| 2018/0234993 A1 | 8/2018 | Hosseini et al. | |
| 2018/0324831 A1 | 11/2018 | Frederiksen et al. | |

FOREIGN PATENT DOCUMENTS

| | | |
|---|---|---|
| WO | WO-2010111524 | 9/2010 |
| WO | WO-2015142429 | 9/2015 |
| WO | WO-2016126398 A1 | 8/2016 |
| WO | WO-2017014558 A1 | 1/2017 |

OTHER PUBLICATIONS

International Search Report and Written Opinion—PCT/US2018/017671—ISA/EPO—dated Apr. 18, 2018.
International Preliminary Report on Patentability—PCT/US2018/017671, The International Bureau of WIPO—Geneva, Switzerland, dated Aug. 29, 2019.
LG Electronics: "Discussion on Multiplexing of eMBB and URLLC for downlink", 3GPP Draft; R1-1702488 Discussion on Multiplexing of eMBB And URLLC For Dl, 3rd Generation Partnership Project (3GPP), Mobile Competence Centre; 650, Route Des Lucioles; F-06921 Sophia-Antipolis Ced; vol. RAN WG1, No. Athens, Greece; Feb. 13, 2017-Feb. 17, 2017, Feb. 12, 2017 (Feb. 12, 2017), 7 pages, XP051209642, Retrieved from the Internet: URL: http://www.3gpp.org/ftp/Meetings_3GPP_SYNC/RAN1/Docs/.
Nokia, et al., "On Indication for Downlink Punctured/Preemptive Scheduling", 3GPP TSG-RAN WG1 #88, 3GPP Draft; R1-1703327_Punctured Scheduling_Final, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 4 Pages, XP051210457, Retrieved from the Internet: URL: http://www.3gpp.org/ftp/Meetings_3GPP_SYNC/RAN1/Docs/.
Taiwan Search Report—TW107104950—TIPO—dated Apr. 17, 2021 (172895TW).
Intel Corporation: "Downlink Multiplexing of eMBB/URLLC Transmissions", 3GPP Draft, 3GPP TSG RAN1 WG Meeting #88, R1-1702240, Intel—URLLC_EMBB_MUX_DL, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 13, 2017-Feb. 17, 2017, Feb. 12, 2017 (Feb. 12, 2017), XP051209398, 7 pages, Retrieved from the Internet:URL: http://www.3gpp.org/ftp/Meetings_3GPP_SYNC/RAN1/Docs/ [retrieved on Feb. 12, 2017] paragraph [0002]-paragraph [0003].
Taiwan Search Report—TW110143902—TIPO—dated Feb. 16, 2022 (172895TWD1).
Huawei, et al., "Support of URLLC in DL" [online], 3GPP Draft, 3GPP TSG-RAN WG1 #86bis, R1-1608844, Lisbon, Portugal, Oct. 10-14, 2016, 6 Pages, Retrieved from the Internet URL: http://www.3gpp.org/ftp/tsg_ran/WG1_RL1/TSGR1_86b/Docs/R1-1608844.zip.

* cited by examiner

POST-PUNCTURE INDICATION FOR MOBILE BROADBAND AND LOW LATENCY COMMUNICATION MULTIPLEXING

CROSS REFERENCES

The present application for patent is a Continuation of U.S. patent application Ser. No. 15/704,389 by Hosseini et al., entitled "Post-Puncture Indication For Mobile Broadband and Low Latency Communication Multiplexing" filed Sep. 14, 2017, which claims priority to U.S. Provisional Patent Application No. 62/460,084 by Hosseini, et al., entitled "Post-Puncture Indication For Mobile Broadband and Low Latency Communication Multiplexing," filed Feb. 16, 2017, assigned to the assignee hereof.

BACKGROUND

The following relates generally to wireless communication and more specifically to post-puncture indication for mobile broadband (MBB) (or enhanced MBB (eMBB)) and low latency communication multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink, single-carrier frequency division multiple access (SC-FDMA) on the uplink, and multiple-input multiple-output (MIMO) antenna technology.

LTE or current versions of LTE may not, however, contemplate or address coexistence of certain types of communication. For example, coexistence of high bandwidth communications and low latency, high reliability, or mission critical traffic may not be supported with existing communication schemes.

SUMMARY

Some wireless communications systems may support different types of communications, such as mobile broadband (MBB) communications and low latency communications. Low latency communications may be associated with bursty and unpredictable transmissions. To facilitate low latency communications, a base station may identify resources allocated for MBB communications, and the base station may reassign (or puncture) these resources for low latency communications.

Accordingly, the base station may transmit an indication of the reassigned (or punctured) resources to one or more user equipment (UEs). The base station may transmit an indication of the reassigned resources in a transmission time interval (TTI) that is subsequent to a TTI reassigned (or punctured) for low latency communications (e.g., a post indication). The base station may transmit the post indication in a retransmission grant of a physical downlink control channel (PDCCH) or in downlink control information (DCI) of a PDCCH.

A method for wireless communication is described. The method may include receiving a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration and attempting to decode data from resources of the set of resources based at least in part on the control message.

An apparatus for wireless communication is described. The apparatus may include means for receiving a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration and means for attempting to decode data from resources of the set of resources based at least in part on the control message.

Another apparatus for wireless communication is described. The apparatus may include a processor, memory in electronic communication with the processor, and instructions stored in the memory. The instructions may be operable to cause the processor to receive a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration and attempt to decode data from resources of the set of resources based at least in part on the control message.

A non-transitory computer readable medium for wireless communication is described. The non-transitory computer-readable medium may include instructions operable to cause a processor to receive a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration and attempt to decode data from resources of the set of resources based at least in part on the control message.

In some examples of the method, apparatus, and non-transitory computer-readable medium described above, the control message includes a retransmission grant and an indication of resources punctured during the prior TTI having the first duration. Some examples of the method, apparatus, and non-transitory computer-readable medium described above may further include processes, features, means, or instructions for identifying a failed decode attempt of a first transport block mapped to the resources punctured during the prior TTI. Some examples of the method, apparatus, and non-transitory computer-readable medium described above may further include processes, features, means, or instructions for transmitting a negative acknowledgement (NAK) based at least in part on the failed decode attempt of the first transport block, where the control message may be responsive to the NAK.

Some examples of the method, apparatus, and non-transitory computer-readable medium described above may further include processes, features, means, or instructions for receiving a second transport block that includes a redundancy version of the first transport block based at least in part on the retransmission grant. Some examples of the method, apparatus, and non-transitory computer-readable medium described above may further include processes, features, means, or instructions for combining information from the first transport block and information from the second transport block, where the combining may be based at least in part on the indication of resources punctured during the prior TTI.

Some examples of the method, apparatus, and non-transitory computer-readable medium described above may further include processes, features, means, or instructions for resetting a decoding hypothesis based at least in part on the indication of resources punctured during the prior TTI, and combining information from a set of transport blocks based at least in part on the reset decoding hypothesis. Some examples of the method, apparatus, and non-transitory computer-readable medium described above may further include processes, features, means, or instructions for refraining from decoding the reassigned resources of the prior TTI based at least in part on the control message.

In some examples of the method, apparatus, and non-transitory computer-readable medium described above, the control message includes first DCI that indicates the reassigned resources of the prior TTI. Some examples of the method, apparatus, and non-transitory computer-readable medium described above may further include processes, features, means, or instructions for monitoring the control region for the first DCI and for a second DCI that indicates an assignment of uplink or downlink resources. In some examples of the method, apparatus, and non-transitory computer-readable medium described above, a first number of decoding candidates for the first DCI may be less than a second number of decoding candidates for the second DCI.

In some examples of the method, apparatus, and non-transitory computer-readable medium described above, a set of decoding candidates for the first DCI may be defined by one or more aggregation levels that may be based at least in part on a link condition. Some examples of the method, apparatus, and non-transitory computer-readable medium described above may further include processes, features, means, or instructions for receiving radio resource control (RRC) signaling that indicates the one or more aggregation levels for the first DCI.

Some examples of the method, apparatus, and non-transitory computer-readable medium described above may further include processes, features, means, or instructions for determining that a modulation order used for communicating on the reassigned resources of the prior TTI may be greater than a threshold. Some examples of the method, apparatus, and non-transitory computer-readable medium described above may further include processes, features, means, or instructions for monitoring the control region for the control message based at least in part on the determination.

Some examples of the method, apparatus, and non-transitory computer-readable medium described above may further include processes, features, means, or instructions for determining that a coding rate used for communicating on the reassigned resources of the prior TTI may be greater than a threshold. Some examples of the method, apparatus, and non-transitory computer-readable medium described above may further include processes, features, means, or instructions for monitoring the control region for the control message based at least in part on the determination.

Some examples of the method, apparatus, and non-transitory computer-readable medium described above may further include processes, features, means, or instructions for determining that a number of spatial layers or a rank of transmission used for communicating on the reassigned resources of the prior TTI may be greater than a threshold. Some examples of the method, apparatus, and non-transitory computer-readable medium described above may further include processes, features, means, or instructions for monitoring the control region for the control message based at least in part on the determination.

Some examples of the method, apparatus, and non-transitory computer-readable medium described above may further include processes, features, means, or instructions for determining that a sub-band of a system bandwidth used for the other type of communications during the prior TTI may be available for the other type of communications during the prior TTI. Some examples of the method, apparatus, and non-transitory computer-readable medium described above may further include processes, features, means, or instructions for monitoring the control region for the control message based at least in part on the determination.

A method for wireless communication is described. The method may include transmitting data on resources of a set of resources allocated for MBB communications and transmitting a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration.

An apparatus for wireless communication is described. The apparatus may include means for transmitting data on resources of a set of resources allocated for MBB communications and means for transmitting a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration.

Another apparatus for wireless communication is described. The apparatus may include a processor, memory in electronic communication with the processor, and instructions stored in the memory. The instructions may be operable to cause the processor to transmit data on resources of a set of resources allocated for MBB communications and transmit a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration.

A non-transitory computer readable medium for wireless communication is described. The non-transitory computer-readable medium may include instructions operable to cause a processor to transmit data on resources of a set of resources allocated for MBB communications and transmit a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration.

In some examples of the method, apparatus, and non-transitory computer-readable medium described above, the control message includes a retransmission grant and an indication of resources punctured during the prior TTI having the first duration. In some examples of the method, apparatus, and non-transitory computer-readable medium described above, transmitting the data on the resources of the set of resources allocated for MBB communications includes transmitting a first transport block mapped to the resources punctured during the prior TTI.

Some examples of the method, apparatus, and non-transitory computer-readable medium described above may further include processes, features, means, or instructions for receiving a NAK associated with the first transport block. Some examples of the method, apparatus, and non-transitory computer-readable medium described above may further include processes, features, means, or instructions for transmitting a second transport block that includes a redundancy version of the first transport block based at least in part on receiving the NAK.

In some examples of the method, apparatus, and non-transitory computer-readable medium described above, the control message includes first DCI that indicates resources punctured during the prior TTI having the first duration. Some examples of the method, apparatus, and non-transitory computer-readable medium described above may further include processes, features, means, or instructions for transmitting second DCI that indicates an assignment of uplink or downlink resources. In some examples of the method, apparatus, and non-transitory computer-readable medium described above, a first number of decoding candidates for the first DCI may be less than a second number of decoding candidates for the second DCI.

In some examples of the method, apparatus, and non-transitory computer-readable medium described above, a set of decoding candidates for the first DCI may be defined by one or more aggregation levels that may be based at least in part on a link condition. Some examples of the method, apparatus, and non-transitory computer-readable medium described above may further include processes, features, means, or instructions for transmitting RRC signaling that indicates the one or more aggregation levels for the first DCI.

DETAILED DESCRIPTION

Some wireless communications systems support reassignment of mobile broadband (MBB) (or enhanced MBB (eMBB)) resources by communicating an indication of the reassigned resources when or after the resources have been reassigned. Low latency communications may be associated with bursty and unpredictable transmissions. To facilitate such communications, a base station may identify resources originally allocated for MBB communications and reassign these resources for low latency communications (e.g., using puncturing). In such cases, the base station may indicate the reassigned resources (or punctured resources) to the user equipment (UE) whose resources have been reassigned. Efficient techniques for indicating reassigned resources to UEs (e.g., MBB UEs) in a transmission time interval (TTI) subsequent to the TTI reassigned (or punctured) for low latency communications may be desirable to improve throughput and UE performance in a wireless communications system.

In some cases, a base station may indicate the reassigned resources (e.g., to one or more UEs) using a designated indication channel. This type of indication may be referred to as a current indication, and the base station may transmit the current indication in the first slot (e.g., a mini-slot) of a set of one or more slots (e.g., mini-slots) reassigned for low latency communications. However, to support the use of a current indication, the base station may allocate a substantial portion of a system bandwidth for transmission over the indication channel. Such an allocation of resources for the indication channel may be wasteful and may increase overhead in a wireless communications system.

As described herein, some wireless communications systems may support efficient techniques for indicating reassigned (or punctured) resources to one or more UEs. Specifically, a base station may transmit the indication of the reassigned (or punctured) resources in a TTI subsequent to the TTI reassigned for low latency communications. This type of indication may be referred to as a post indication. A base station may include the post indication in a retransmission grant of a physical downlink control channel (PDCCH) or in downlink control information (DCI) of a PDCCH. The post indication may indicate the location of the reassigned (or punctured) resources.

Aspects of the disclosure introduced above are described below in the context of a wireless communications system. Examples of processes and signaling exchanges that support post-puncture indication for MBB and low latency communication multiplexing are then described. Aspects of the disclosure are further illustrated by and described with reference to apparatus diagrams, system diagrams, and flowcharts that relate to post-puncture indication for MBB and low latency communication multiplexing. While references may be made to MBB, techniques described herein may apply to eMBB.

Figure 1:
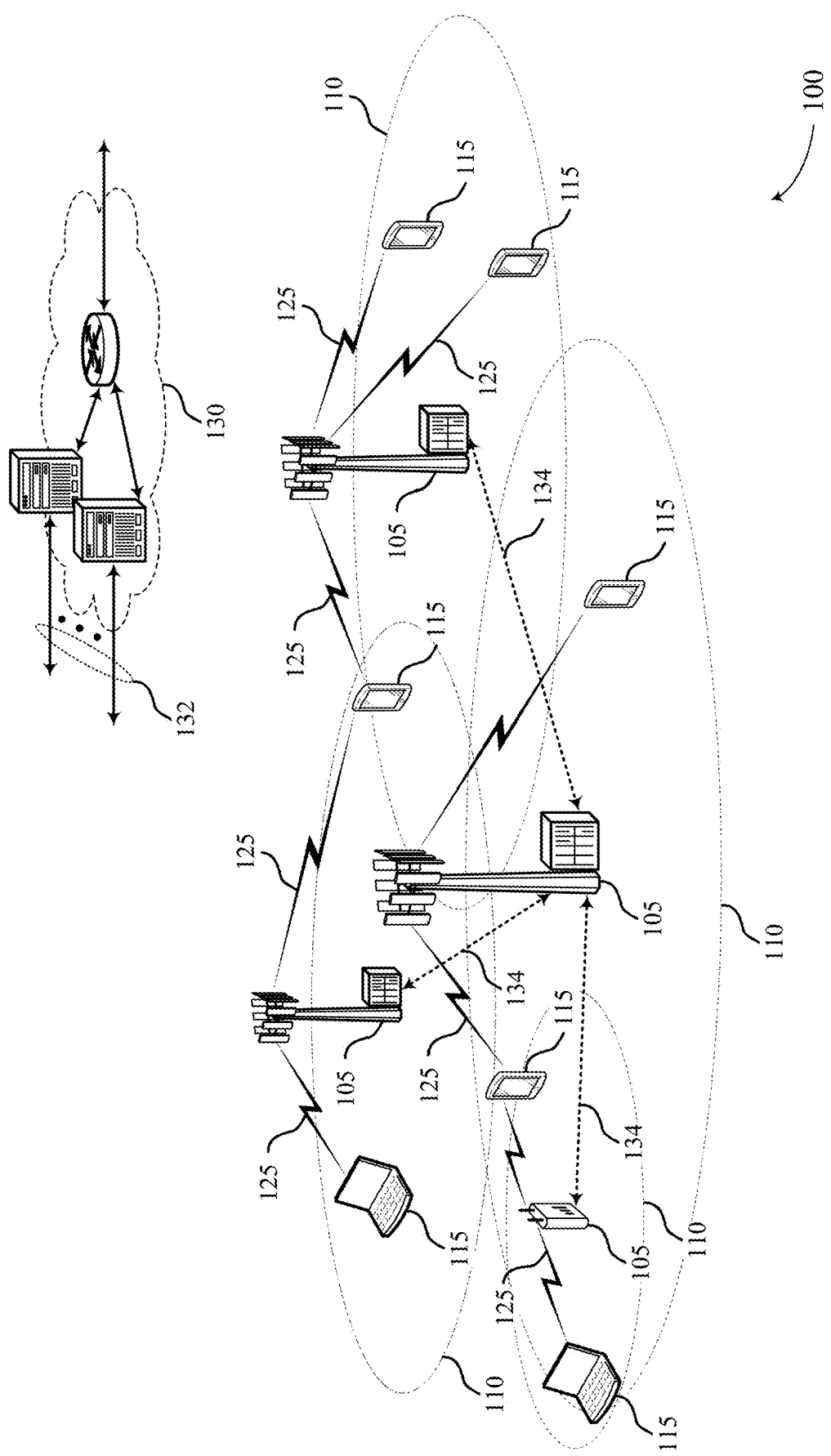
FIG. 1 illustrates an example of a wireless communications system that supports post-puncture indication for mobile broadband (MBB) and low latency communication multiplexing in accordance with various aspects of the present disclosure.

FIG. 1 illustrates an example of a wireless communications system 100 that supports post-puncture indication for MBB and low latency communication multiplexing in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network.

Wireless communications system 100 may support broadband communications (e.g., MBB communications or eMBB communications, which may be used interchangeably herein), ultra-reliable low latency communications (URLLC), and communications with low-cost and low-complexity devices. URLLC may be referred to as mission critical (MiCr) communications and may be associated with low latency, high reliability, and, in some cases, bursty and unpredictable transmissions. In some examples, low latency communications (e.g., URLLC) may have a higher priority than other types of communication, such as MBB. URLLC, MiCr communications, and low latency communications may be used interchangeably herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data for one or more types of communications may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like. UEs 115 may be configured for MBB communications or URLLC communications, or both.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, UEs 115 and base stations 105 may support retransmissions of data to increase the chances that data is received successfully. Hybrid automatic repeat request (HARQ) feedback is one technique of increasing the likelihood that data is received correctly over a wireless communication link 125. HARQ may include a combination of error detection techniques (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In incremental redundancy HARQ, incorrectly received data may be stored in a buffer and combined with subsequent transmissions to improve the overall likelihood of successfully decoding the data. In some cases, redundancy bits are added to each message prior to transmission. This may be useful in poor link or channel conditions.

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., a short TTI) may be used (e.g., a mini-slot). Wireless communications system 100 may employ various TTI durations, including those that facilitate URLLC and MBB communications, in addition to other types of communication associated with LTE and NR.

A resource element may consist of one symbol period and one subcarrier (e.g., a 15 kHz frequency range). In some cases, the numerology employed within a system (i.e., symbol size, subcarrier size, symbol-period duration, and/or TTI duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots.

In some cases, a base station 105 may semi-statically allocate resources for low latency communications and MBB communications, and these different types of communications may be multiplexed over time and frequency resources. However, because low latency communications may be unpredictable, it may be challenging for a base station to allocate an appropriate amount of resources for low latency communications with a UE 115. For example, if the base station allocates a small amount of resources for low latency communications, there may not be sufficient resources available for communication when data traffic is high. Alternatively, if the base station allocates a large amount of resources for low latency communications, resources may be unused when data traffic is low. Accordingly, rather than semi-statically allocating resources for low latency communication, a base station 105 may interrupt MBB communications (e.g., using puncturing) to accommodate bursty low latency communications.

Thus, low latency communications and MBB communications may be multiplexed in the time domain using puncturing. In such cases, it may be appropriate for the base station 105 to indicate the resources reassigned (or punctured) for low latency communications to a UE 115 operating in an MBB mode (i.e., an MBB UE 115). For example, the base station 105 may transmit an indication to the MBB UE 115 (e.g., whose resources have been reassigned) to inform the MBB UE 115 of the reassigned resources. The indication may contain information such as a flag on the resources reassigned for low latency communications, the specific time and frequency resources reassigned, power ratio information to be used for communication on the reassigned resources, etc.

The MBB UE 115 may receive the indication and refrain from communicating with the base station 105 on the punctured resources. As such, the decoding performance (e.g., block error rate (BLER)) of the MBB UE 115 may be improved and the MBB UE 115 may save power. In some cases, the base station 105 may transmit the indication using different resources or channels. In one example, the base station 105 may transmit the indication over an indication channel in the same TTI reassigned (or punctured) for low latency communications. Such an indication may be referred to as a current indication. In some cases, however, a base station 105 may allocate substantial resources for the indication channel. In such cases, the use of an indication channel may result in high overhead in a wireless communications system.

Wireless communications system 100 may support efficient techniques for indicating punctured resources to an MBB UE 115 and a low latency UE 115. Specifically, a base station 105 may transmit an indication of the punctured resources to an MBB UE 115 in a TTI subsequent to the TTI reassigned (or punctured) for low latency communications. Such an indication may be referred to as a post indication. In some cases, base station 105 may include the post indication in a retransmission grant transmitted on a PDCCH, and, in other cases, base station 105 may include the post indication in DCI transmitted on a PDCCH.

Figure 2:
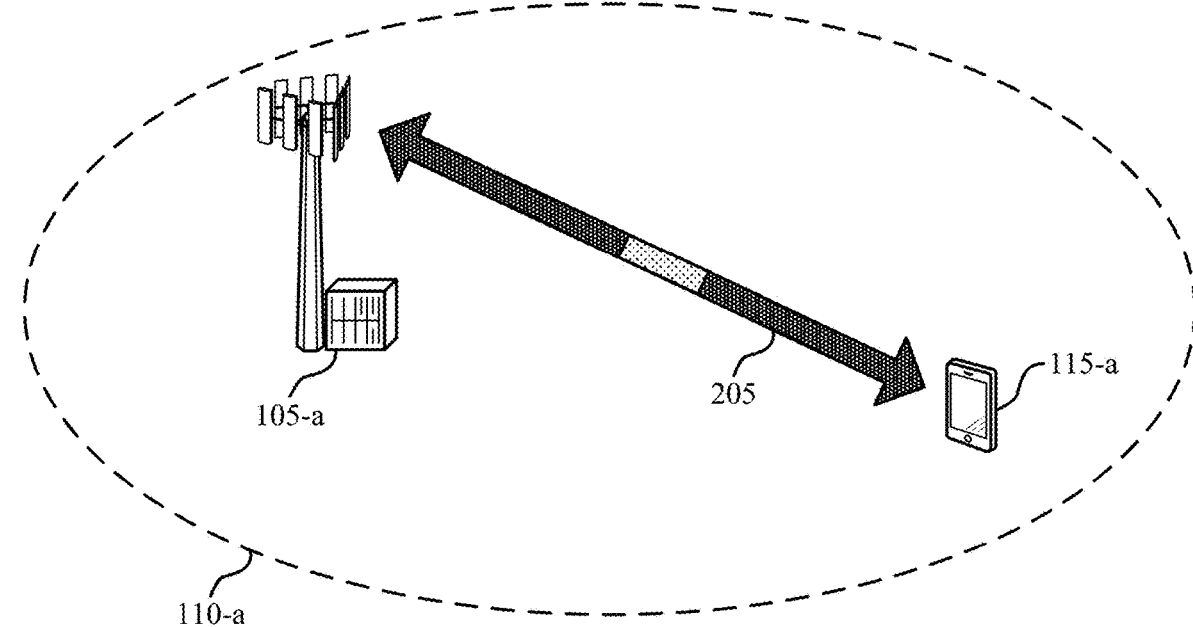
FIG. 2 illustrates an example of a wireless communications system that supports post-puncture indication for MBB and low latency communication multiplexing in accordance with various aspects of the present disclosure.

FIG. 2 illustrates an example of a wireless communications system 200 that supports post-puncture indication for MBB and low latency communication multiplexing in accordance with various aspects of the present disclosure. Wireless communications system 200 includes base station 105-a, which may be an example of a base station 105 described with reference to FIG. 1. Base station 105-a may provide communication coverage for a respective coverage area 110-a, which may be an example of a coverage area 110 described with reference to FIG. 1. Wireless communications system 200 also includes UE 115-a, which may be an example of a UE 115 described with reference to FIG. 1. In the present example, UE 115-a may operate in an MBB mode and may be referred to as an MBB UE 115-a.

Wireless communications system 200 may support different types of wireless communications, including MBB communications 210 and low latency communications 215. MBB UE 115-a may communicate with base station 105-a over carrier 205 (e.g., MBB communications 210). Wireless communications system 200 may support low latency communications 215 with another UE 115 or with MBB UE 115-a. As described with reference to FIG. 1, low latency communications 215 may be bursty and unpredictable. Accordingly, to facilitate low latency communications 215, resources originally allocated for MBB communications 210 may be reassigned or reallocated for low latency communications 215 (e.g., using puncturing). In such cases, it may be appropriate for the base station 105-a to indicate the time and frequency resources reassigned for low latency communications 215 (e.g., punctured resources).

Wireless communications system 200 may support efficient techniques for indicating reassigned (or punctured) resources to one or more UEs. For example, base station 105-a may transmit an indication of resources reassigned for low latency communications 215 to UE 115-a in a TTI subsequent to the TTI punctured for low latency communications 215. This type of indication of reassigned (or punctured) resources following a punctured transmission may be referred to as a post indication.

In some cases, base station 105-a may include the post indication in a retransmission grant transmitted in a PDCCH to UE 115-a over carrier 205. As an example, base station 105-a may transmit a transport block to UE 115-a on resources reassigned (or punctured) for low latency communications 215. However, UE 115-a may not be able to decode the transport block. That is, UE 115-a may attempt to decode the transport block, and UE 115-a may fail to decode the transport block. In such cases, UE 115-a may transmit a negative acknowledgment (NAK)—e.g., as part of a HARQ process—to base station 105-a for the transport block.

In response to the NAK, base station 105-a may transmit a retransmission grant that indicates that the resources used for the transmission of the transport block was punctured for low latency communications 215. The retransmission grant may also schedule a retransmission of the transport block (e.g., a redundancy version of the transport block). Base station 105-a may then transmit the redundancy version of the transport block to UE 115-a (e.g., with an appropriate redundancy version identifier (RVID)). UE 115-a may receive the redundancy version of the transport block, reset a decoding hypothesis associated with the punctured resources (e.g., set a log-likelihood (LLR) ratio to zero), and combine information from the first (e.g., original) transport block with information from the redundancy version of the transport block to correctly decode the transport block. In some examples, a retransmission may include some but not all previously transmitted transport blocks, code blocks, or code block groups. This type of scheme may be employed instead of or in addition to an ACK/NAK scheme, and a UE 115-*a* may send an index of missed code blocks or code block groups, for example.

In other cases, base station 105-*a* may include the post indication in DCI transmitted in a PDCCH to UE 115-*a* over carrier 205 during a TTI subsequent to and adjacent to the TTI punctured for low latency communications 215. In some aspects, UE 115-*a* may determine that a modulation order, coding rate, or number of layers (or rank) used for MBB communications is lower or greater than a given threshold, or UE 115-*a* may determine that a sub-band allocated for MBB communications 210 is not subject to reallocation for low latency communications 215.

In such aspects, UE 115-*a* may refrain from monitoring for the post indication in the DCI, and, in an example, UE 115-*a* may decode MBB downlink transmissions received on the punctured resources. Otherwise, UE 115-*a* may monitor the PDCCH for the post indication of the reassigned (or punctured) resources during the TTI subsequent to and adjacent to the TTI punctured for low latency communications 215. UE 115-*a* may then refrain from attempting to decode MBB transmissions received on the reassigned (or punctured) resources. Specifically, UE 115-*a* may reset a decoding hypothesis associated with the reassigned (or punctured) resources based on the indication of the reassigned (or punctured) resources.

In some cases, UE 115-*a* may finish decoding the post indication of the reassigned (or punctured) resources before decoding all the code blocks of a downlink MBB transmission on the reassigned (or punctured) resources. In such cases, UE 115-*a* may identify (e.g., based on the indication) that the resources used to transmit the code blocks were punctured for low latency communications 215. Accordingly, UE 115-*a* may save power by refraining from decoding the remaining code blocks of the downlink data transmitted on the punctured resources. That is, the UE 115-*a* may refrain from demodulating symbols of the remaining code blocks and refrain from running a decoding algorithm for the remaining code blocks.

In some examples, UE 115-*a* may not be scheduled for communication during the TTI subsequent to and adjacent to the TTI punctured for low latency communications 215. In such cases, base station 105-*a* may transmit DCI with a specific DCI format for the post indication, and UE 115-*a* may monitor the PDCCH of the TTI subsequent to and adjacent to the TTI punctured for low latency communications 215 for the DCI with the specific DCI format. The transmission of the DCI may be directed to a specific UE (e.g., MBB UE 115-*a*), a group of UEs, or broadcasted to all UEs in wireless communications system 200.

MBB UE 115-*a* may receive the PDCCH and blind decode the PDCCH to identify the DCI with the specific DCI format. To reduce the number of blind decodes performed by UE 115-*a*, base station 105-*a* may transmit the DCI using a fixed aggregation level. The aggregation level may be configured based on link conditions, and may be signaled to UE 115-*a* using higher layer signaling. Further, the number of candidates for blind decodes for UE 115-*a* to identify the DCI with the specific DCI format may be fewer than the number of candidates for blind decodes for UE 115-*a* to identify a DCI with other DCI formats.

Figure 3:
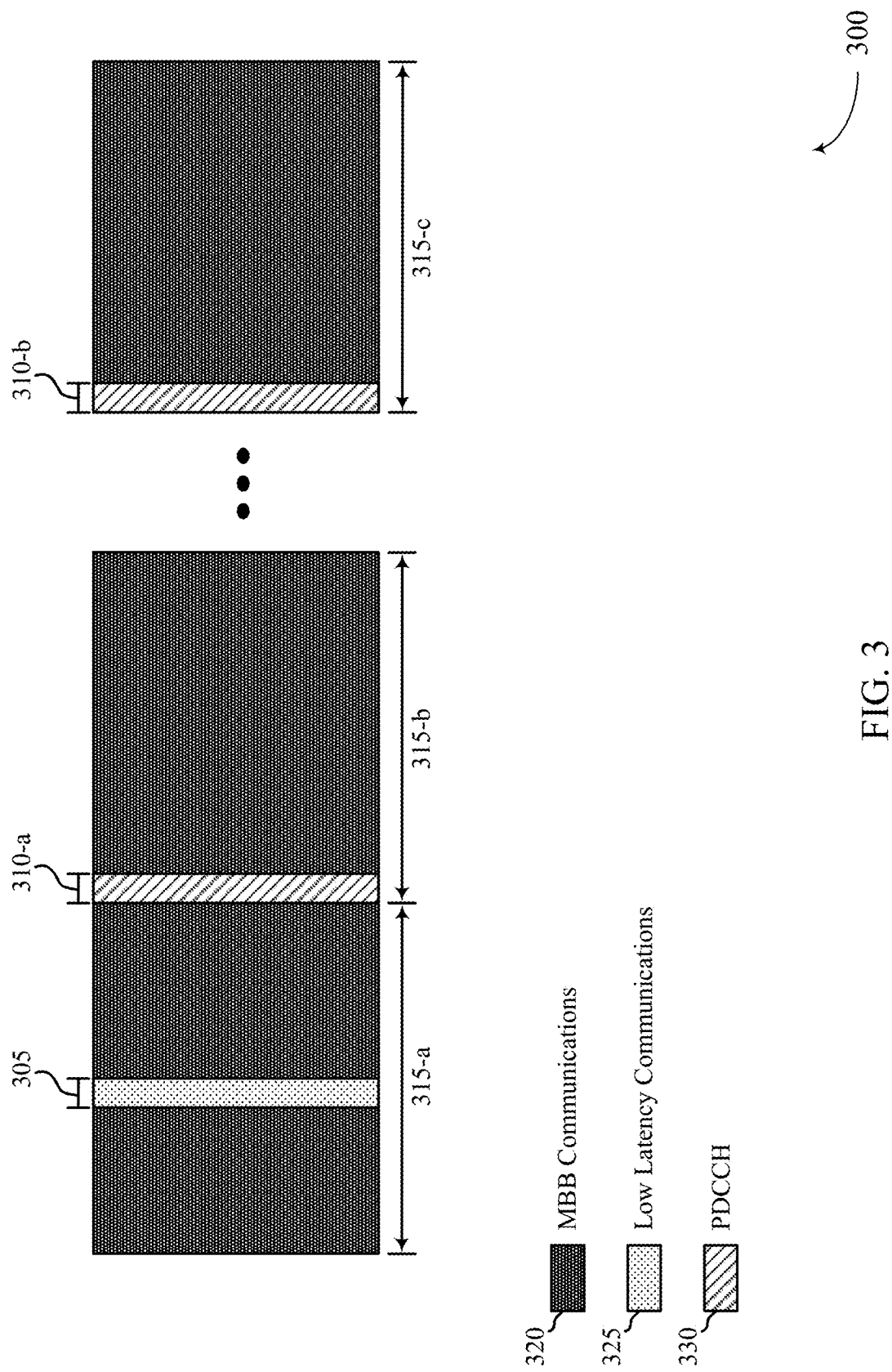
FIG. 3 illustrates an example of a post-puncture indication scheme for MBB and low latency communication multiplexing in accordance with various aspects of the present disclosure.

FIG. 3 illustrates an example of a post-puncture indication scheme 300 for MBB and low latency communication multiplexing in accordance with various aspects of the present disclosure. A base station may allocate resources for MBB communications 320 during TTIs 315. In some cases, the base station may identify low latency data to transmit or receive from a UE operating in a low latency mode. In such cases, the base station may reassign (or puncture) the resources allocated for MBB communications 320 to accommodate low latency communications 325. For example, the base station may reassign resources during a TTI 305 (e.g., a mini-slot) for low latency communications 325. As described herein, the base station may transmit an indication of the reassigned resources in a control region during a TTI (e.g., TTI 315-*b* or TTI 315-*c*) subsequent to the TTI punctured for low latency communications 325 (e.g., TTI 315-*a*). This type of indication may be referred to as a post indication.

In some cases, the base station may include the post indication in a retransmission grant transmitted in a control region (e.g., PDCCH 330) during a subsequent TTI (e.g., TTI 315-*b* or TTI 315-*c*). The base station may communicate with a low latency UE using the reassigned resources (e.g., TTI 305), and the base station may also communicate with an MBB UE using the reassigned resources. For example, the base station may transmit a transport block to the MBB UE on the reassigned resources. In some cases, the UE may receive the transport block and attempt to decode the transport block. The UE may identify that it was unable to decode the transport block (i.e., failed decode attempt), and the UE may transmit a NAK to the base station. The failed decoding may be due to interference from low latency transmissions on the punctured resources, but a UE may be unaware of which resources are punctured before receiving a post indication.

In response to the NAK, the base station may transmit a retransmission grant in a control region of a TTI (e.g., during symbols 310-*b* of TTI 315-*c*). In addition to scheduling resources for a retransmission of the transport block to the UE, the retransmission grant may indicate that the resources used for the transmission of the transport block in TTI 315-*a* was reassigned (or punctured) for low latency communications 325. The UE may then combine information from the original transport block and the retransmitted transport block to correctly decode the transport block. The UE may combine information after taking into account the post indication and may set LLRs to zero when decoding the original transport block on the punctured resources.

In other cases, the base station may include the post indication in DCI (e.g., in PDCCH 330) transmitted in a TTI subsequent to and adjacent to the TTI punctured for low latency communications 325 (e.g., TTI 315-*b*). In some examples, the UE may be scheduled for communication in the TTI (e.g., TTI 315-*b*) subsequent to and adjacent to the TTI punctured for low latency communications (e.g., TTI 315-*a*), and the UE may monitor PDCCH 330 of this TTI to identify the DCI. Based on the indication of the reassigned (or punctured) resources, the UE may refrain from attempting to decode downlink signals (or transport blocks) received on the reassigned (or punctured) resources.

In other examples, the UE may not be scheduled for communication in the TTI (e.g., TTI 315-*b*) subsequent to and adjacent to the TTI punctured for low latency communications (e.g., TTI 315-*a*). In such examples, the base station may include the post indication in DCI transmitted with a specific format in a control region (e.g., PDCCH 330) of the TTI subsequent to and adjacent to the TTI punctured for low latency communications. The DCI may be transmitted with a fixed aggregation level that may be determined based on the condition of a link used for communication with a base station. Additionally or alternatively, the number of candidates for blind decodes for the transmission of the DCI with the specific format may be reduced to allow for more efficient use of power or faster decoding, or both, at a receiving UE. For example, the number of decoding candidates for the DCI with the specific format (e.g., 2, 4, 6, etc.) may be significantly less than the number of decoding candidates for DCIs with other formats (e.g., 44). In some cases, a UE may monitor a subsequent TTI (e.g., always monitor) for DCI transmitted with any format that indicates resources reassigned (or punctured) for low latency communications.

Figure 4:
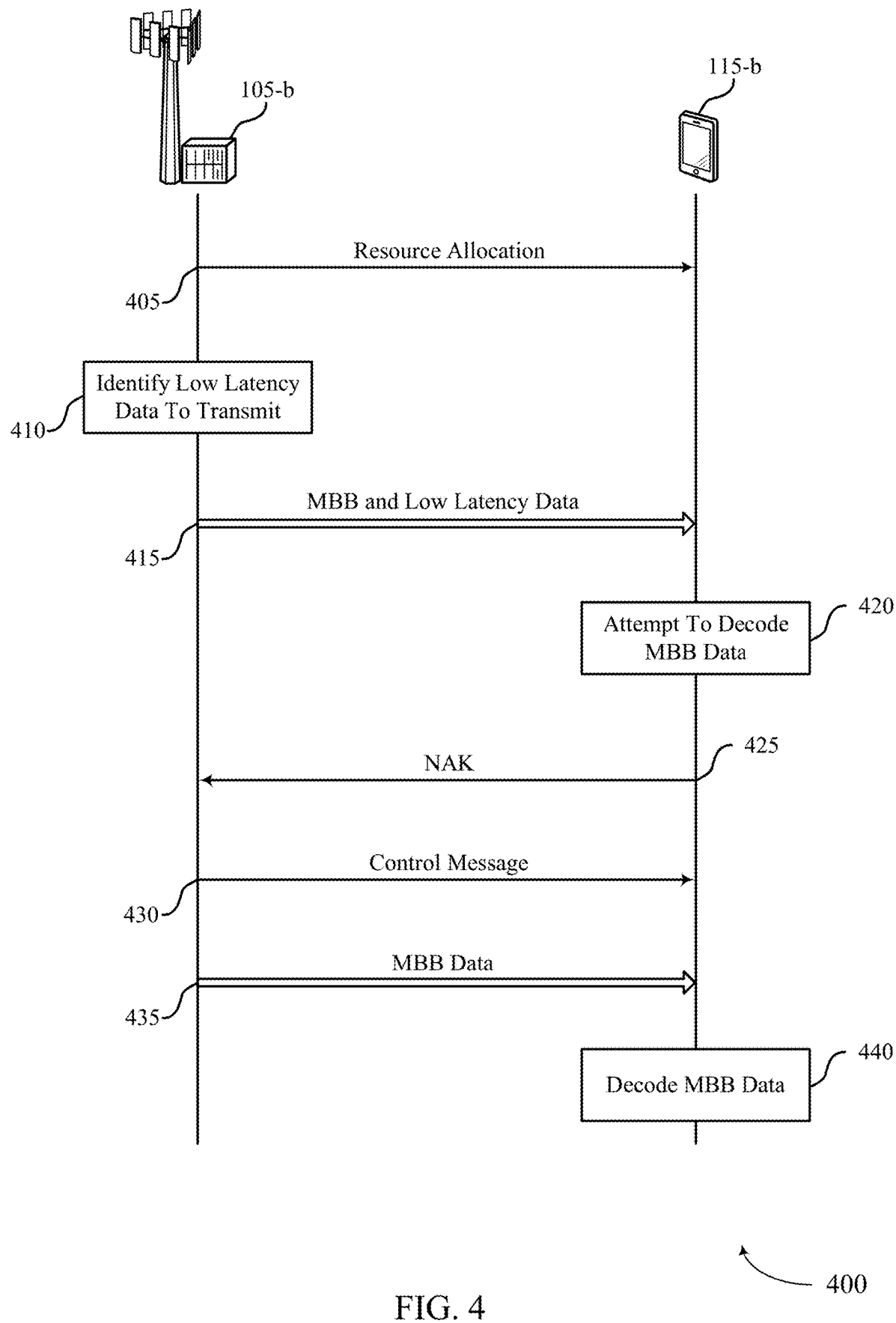
FIG. 4 illustrates an example of a process flow that supports post-puncture indication for MBB and low latency communication multiplexing in accordance with various aspects of the present disclosure.

FIG. 4 illustrates an example of a process flow 400 that supports post-puncture indication for MBB and low latency communication multiplexing in accordance with various aspects of the present disclosure. Process flow 400 illustrates aspects of techniques performed by a base station 105-*b*, which may be an example of a base station 105 described with reference to FIGS. 1-2. Process flow 400 also illustrates aspects of techniques performed by a UE 115-*b*, which may be an example of a UE 115 described with reference to FIGS. 1-2. UE 115-*b* may operate in an MBB mode and may be referred to as an MBB UE 115-*b*.

At 405, base station 105-*b* may allocate resources for MBB communications with MBB UE 115-*b*. Base station 105-*b* may communicate with UE 115-*b* on the allocated resources. At 410, base station 105-*b* may identify low latency data to transmit to or receive from a low latency UE. In such cases, base station 105-*b* may identify resources allocated for MBB communications, and reassign (or puncture) a portion of these resources for low latency communications.

At 415, base station 105-*b* may communicate with a low latency UE on the reassigned resources, and base station 105-*b* may transmit downlink data (or a transport block) to UE 115-*b* on the reassigned resources. At 420, MBB UE 115-*b* may attempt to decode the downlink data from the base station 105-*b*. In some cases, UE 115-*b* may be able to decode the downlink data. However, in other cases, UE 115-*b* may not be able to decode the downlink data, due to the resources being reassigned for low latency communications. UE 115-*b* may identify the failed decoding attempt, and, at 425, UE 115-*b* may transmit a NAK to the base station 105-*b*.

At 425, base station 105-*b* may receive the NAK from UE 115-*b*, and base station 105-*b* may schedule resources for retransmission of the downlink data (or transport block) to UE 115-*b*. At 430, base station 105-*b* may transmit a control message via a PDCCH that indicates the resources reassigned (or punctured) for low latency communications and the resources scheduled for the retransmission. At 435, base station 105-*b* may then transmit a redundancy version of the downlink data (or transport block). The retransmission of the downlink data (or transport block) may be associated with the same HARQ process ID as the original transmission of the downlink data (or transport block). At 440, UE 115-*b* may then decode the downlink data (or transport block) (e.g., based on combining information from the downlink data received at 415 and at 435).

Figure 5:
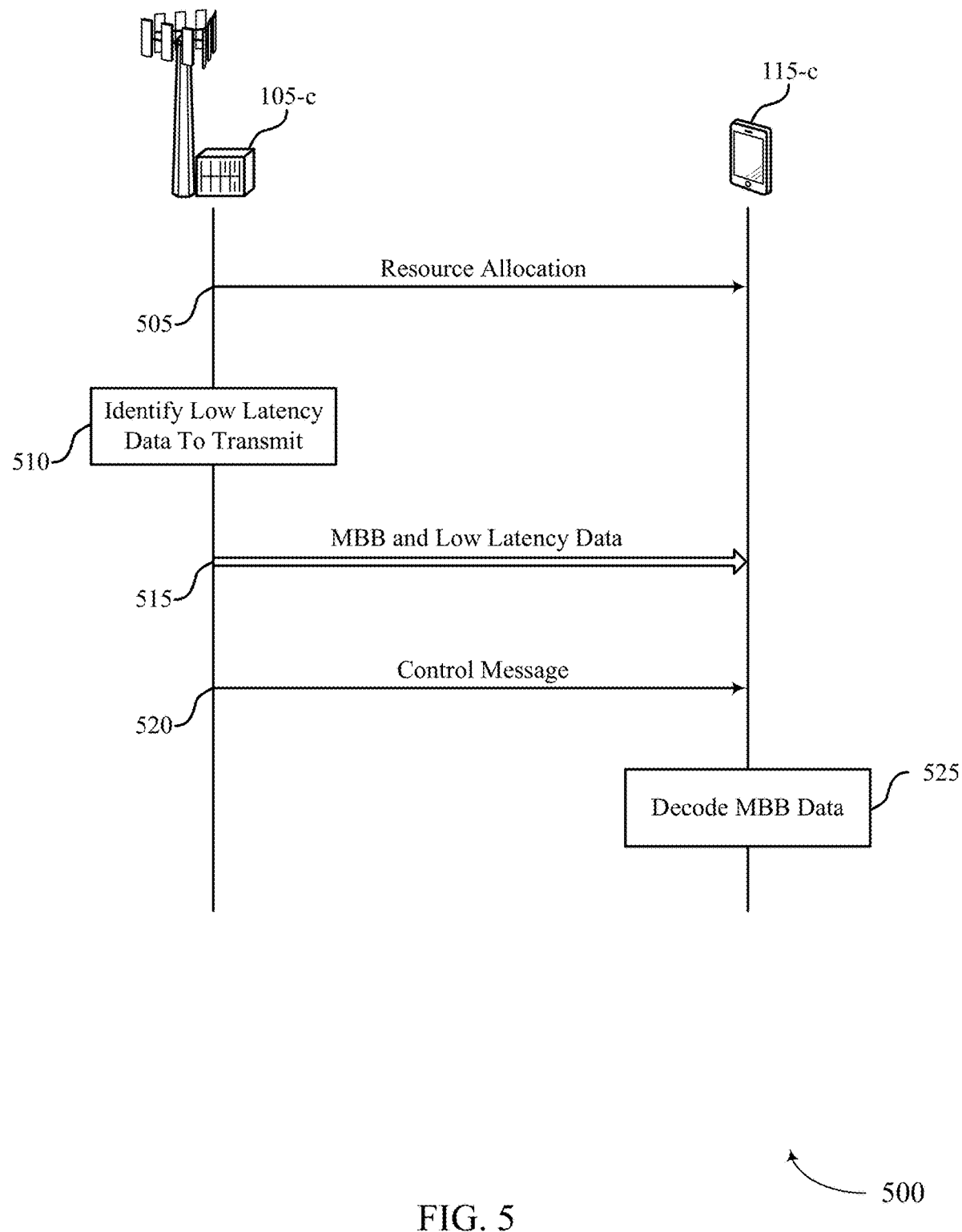
FIG. 5 illustrates an example of a process flow that supports post-puncture indication for MBB and low latency communication multiplexing in accordance with various aspects of the present disclosure.

FIG. 5 illustrates an example of a process flow 500 that supports post-puncture indication for MBB and low latency communication multiplexing in accordance with various aspects of the present disclosure. Process flow 500 illustrates aspects of techniques performed by a base station 105-*c*, which may be an example of a base station 105 described with reference to FIGS. 1-2. Process flow 500 also illustrates aspects of techniques performed by a UE 115-*c*, which may be an example of a UE 115 described with reference to FIGS. 1-2. UE 115-*c* may operate in an MBB mode and may be referred to as an MBB UE 115-*c*.

At 505, base station 105-*c* may allocate resources for MBB communications with MBB UE 115-*c*. Base station 105-*c* may communicate with UE 115-*c* on the allocated resources. At 510, base station 105-*c* may identify low latency data to transmit to or receive from a low latency UE. In such cases, base station 105-*c* may identify resources allocated for MBB communications, and reassign (or puncture) a portion of these resources for low latency communications.

At 515, base station 105-*c* may communicate with a low latency UE on the reassigned resources, and base station 105-*c* may transmit downlink data (or a transport block) to UE 115-*c* on the reassigned resources. At 520, base station 105-*c* may then transmit a control message (or post indication) to UE 115-*c* indicating the resources reassigned (or punctured) for low latency communications. UE 115-*c* may identify the location of the reassigned (or punctured) resources based on the control message, and, at 525, UE 115-*c* may decode MBB data received at 515 based on the control message. In some cases, UE 115-*c* may refrain from attempting to decode the downlink data (or transport block) received on the reassigned (or punctured) resources.

Figure 6:
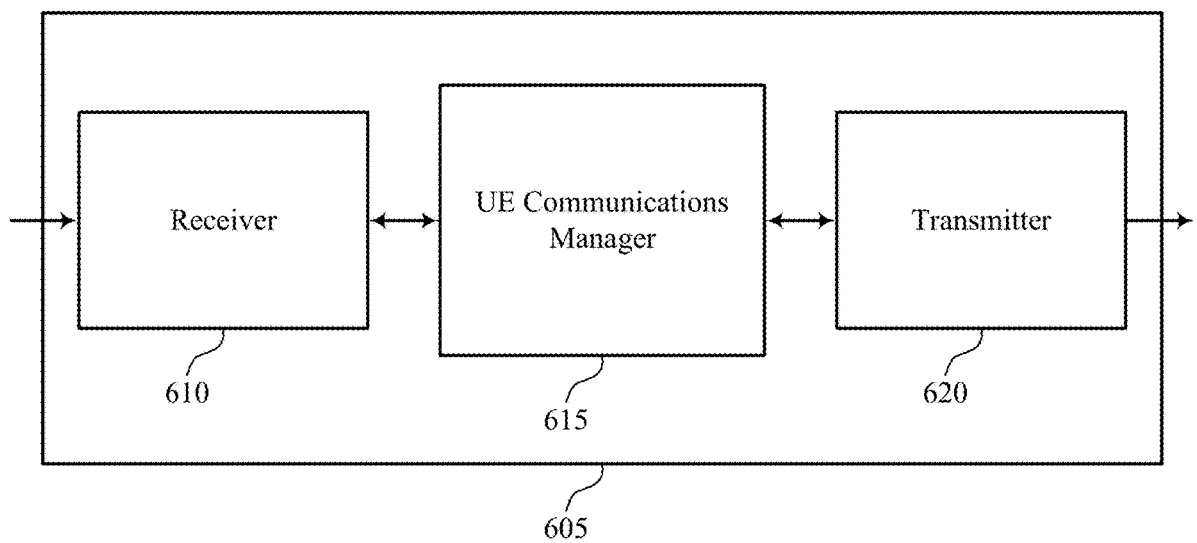
FIGS. 6 through 8 show block diagrams of a device or devices that support post-puncture indication for MBB and low latency communication multiplexing in accordance with various aspects of the present disclosure.

FIG. 6 shows a block diagram 600 of a wireless device 605 that supports post-puncture indication for MBB and low latency communication multiplexing in accordance with various aspects of the present disclosure. Wireless device 605 may be an example of aspects of a UE 115 as described with reference to FIG. 1. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to post-puncture indication for MBB and low latency communication multiplexing, etc.). Information may be passed on to other components of the device. The receiver 610 may be an example of aspects of the transceiver 935 described with reference to FIG. 9.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration. UE communications manager 615 may then attempt to decode data from resources of the set of resources based on the control message.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
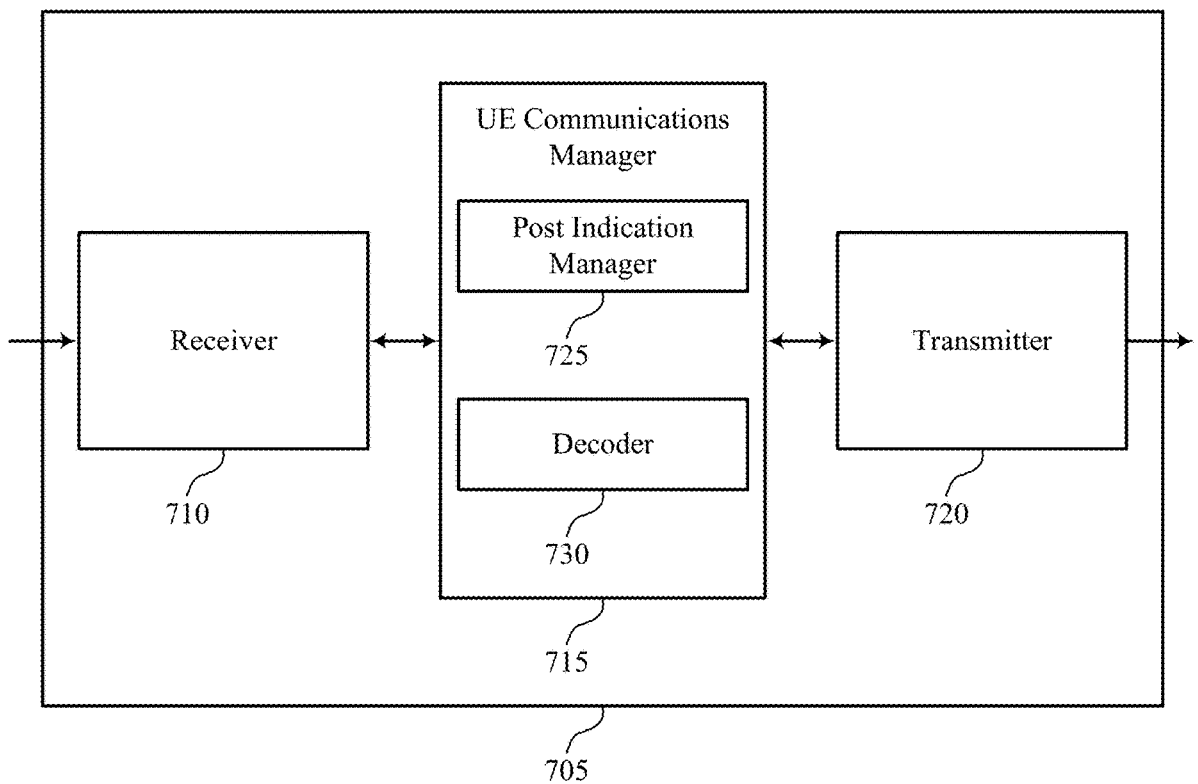

FIG. 7 shows a block diagram 700 of a wireless device 705 that supports post-puncture indication for MBB and low latency communication multiplexing in accordance with various aspects of the present disclosure. Wireless device 705 may be an example of aspects of a wireless device 605 or a UE 115 as described with reference to FIGS. 1 and 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to post-puncture indication for MBB and low latency communication multiplexing, etc.). Information may be passed on to other components of the device. The receiver 710 may be an example of aspects of the transceiver 935 described with reference to FIG. 9.

UE communications manager 715 may be an example of aspects of the UE communications manager 915 described with reference to FIG. 9. UE communications manager 715 may include post indication manager 725 and decoder 730.

Post indication manager 725 may receive a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration.

In some cases, post indication manager 725 may monitor the control region for the control message based on a determination that a modulation order used for communicating during the prior TTI is greater than a threshold. In some cases, post indication manager 725 may monitor the control region for the control message based on a determination that a coding rate used for communicating during the prior TTI is greater than a threshold. In some cases, post indication manager 725 may monitor the control region for the control message based on a determination that a number of spatial layers or a rank of transmission used for communicating during the prior TTI is greater than a threshold.

In some cases, post indication manager 725 may determine that a sub-band of a system bandwidth used for the other type of communications during the prior TTI is available for the other type of communications during the prior TTI, and post indication manager 725 may monitor the control region for the control message based on the determination that the sub-band of the system bandwidth used for the other type of communications during the prior TTI is available for the other type of communications during the prior TTI.

Decoder 730 may attempt to decode data from resources of the set of resources based on the control message. In some cases, decoder 730 may refrain from decoding the reassigned resources of the prior TTI based on the control message. In some cases, the control message includes a retransmission grant and an indication of resources punctured during the prior TTI having the first duration. Decoder 730 may fail to decode a first transport block mapped to the resources punctured during the prior TTI, and decoder 730 may receive a second transport block that includes a redundancy version of the first transport block based on the retransmission grant. In some cases, decoder 730 may combine information from the first transport block and information from the second transport block, where the combining is based on the indication of resources punctured during the prior TTI. Further, decoder 730 may reset a decoding hypothesis based on the indication of resources punctured during the prior TTI, and combine information from a set of transport blocks based on the reset decoding hypothesis.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
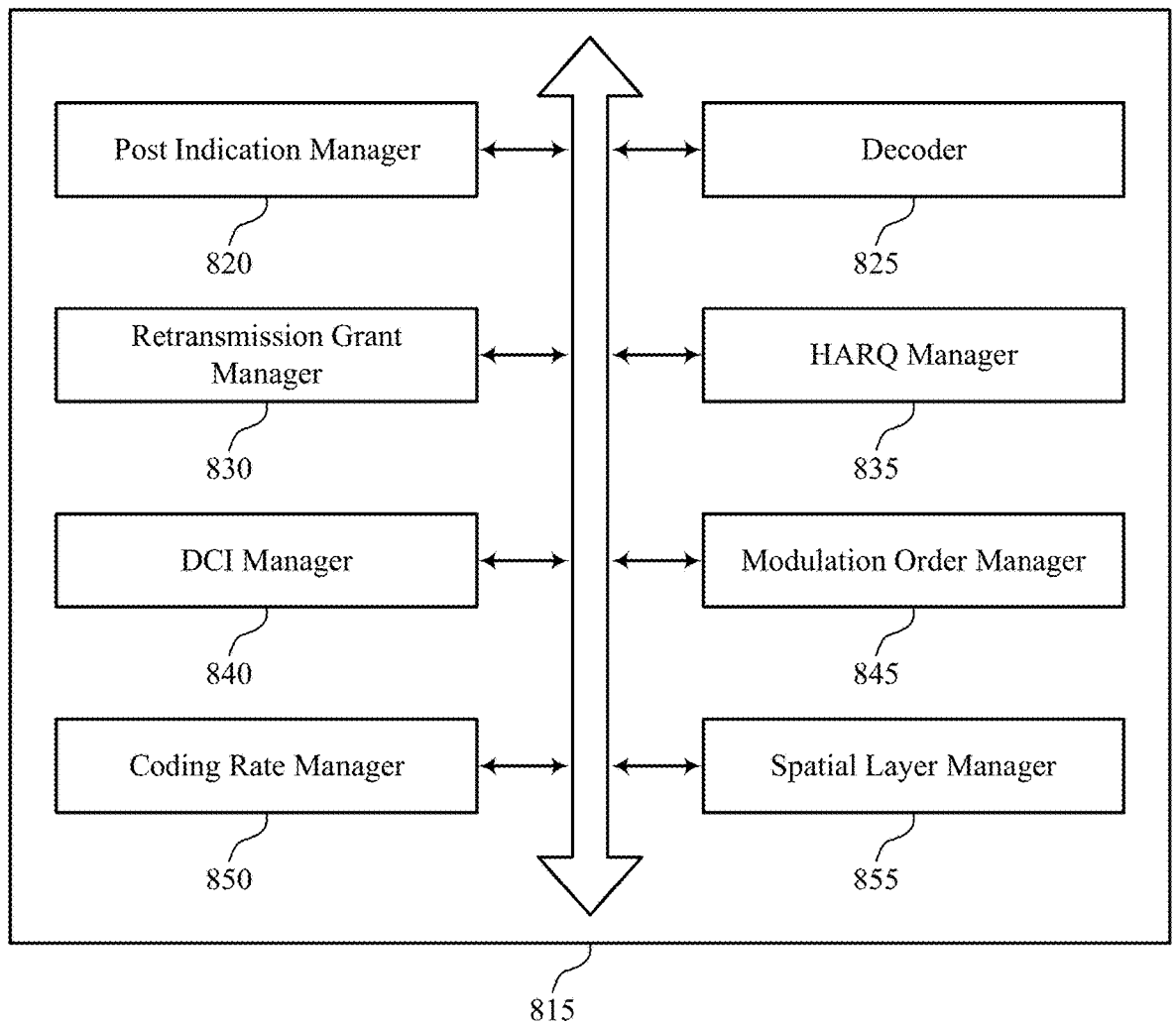

FIG. 8 shows a block diagram 800 of a UE communications manager 815 that supports post-puncture indication for MBB and low latency communication multiplexing in accordance with various aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include post indication manager 820, decoder 825, retransmission grant manager 830, HARQ manager 835, DCI manager 840, modulation order manager 845, coding rate manager 850, and spatial layer manager 855. Each of these modules may communicate, directly or indirectly, with one another (e.g., via one or more buses).

Post indication manager 820 may receive a control message that indicates a reassignment of resources of a set of resources allocated for MBB communications, where the control message is received in a control region of a TTI of a first duration and indicates reassigned resources of a prior TTI of the first duration, and where the reassigned resources are allocated for another type of communications having TTIs of a second duration that is shorter than the first duration.

In some cases, post indication manager 820 may determine that a sub-band of a system bandwidth used for the other type of communications during the prior TTI is available for the other type of communications during the prior TTI, and post indication manager 820 may monitor the control region for the control message based on the determination that the sub-band of the system bandwidth used for the other type of communications during the prior TTI is available for the other type of communications during the prior TTI.

Modulation order manager 845 may determine that a modulation order used for communicating during the prior TTI is greater than a threshold, and post indication manager 820 may monitor the control region for the control message based on the determination that the modulation order used for communicating during the prior TTI is greater than the threshold. Coding rate manager 850 may determine that a coding rate used for communicating during the prior TTI is greater than a threshold, and post indication manager 820 may monitor the control region for the control message based on the determination that the coding rate used for communicating during the prior TTI is greater than the threshold. Spatial layer manager 855 may determine that a number of spatial layers or a rank of transmission used for communicating during the prior TTI is greater than a threshold, and post indication manager 820 may monitor the control region for the control message based on the determination that the number of spatial layers or the rank of transmission used for communicating during the prior TTI is greater than the threshold.

Decoder 825 may attempt to decode data from resources of the set of resources based on the control message. In some cases, decoder 825 may refrain from decoding the reassigned resources of the prior TTI based on the control message. Retransmission grant manager 830 may identify a retransmission grant that indicates the reassignment of resources of the set of resources. In some cases, the control message includes a retransmission grant and an indication of resources punctured during the prior TTI having the first duration. In some cases, decoder 825 may fail to decode a first transport block mapped to the resources punctured during the prior TTI. In such cases, HARQ manager 835 may identify a failed decode attempt of a first transport block mapped to the resources punctured during the prior TTI, and HARQ manager 835 may transmit a NAK based on the failed decode attempt of the first transport block, where the control message is responsive to the NAK. The device of which HARQ manager 835 is an aspect (e.g., device 605 or 705) may not have an indication of which resources are punctured, and the failure to decode may be a result of the puncturing.

Decoder 825 may receive a second transport block that includes a redundancy version of the first transport block based on the retransmission grant. In some cases, decoder 825 may combine information from the first transport block and information from the second transport block, where the combining is based on the indication of resources punctured during the prior TTI. Further, decoder 825 may reset a decoding hypothesis based on the indication of resources punctured during the prior TTI, and combine information from a set of transport blocks based on the reset decoding hypothesis.

DCI manager 840 may identify a first DCI that indicates the reassignment of resources of the set of resources. In some cases, the control message includes first DCI that indicates the reassigned resources of the prior TTI. In some cases, DCI manager 840 may monitor the control region for the first DCI and for a second DCI that indicates an assignment of uplink or downlink resources. In some cases, a first number of decoding candidates for the first DCI is less than a second number of decoding candidates for the second DCI. In some cases, a set of decoding candidates for the first DCI are defined by one or more aggregation levels that are based on a link condition. In some cases, DCI manager 840 may receive radio resource control (RRC) signaling that indicates the one or more aggregation levels for the first DCI.

Figure 9:
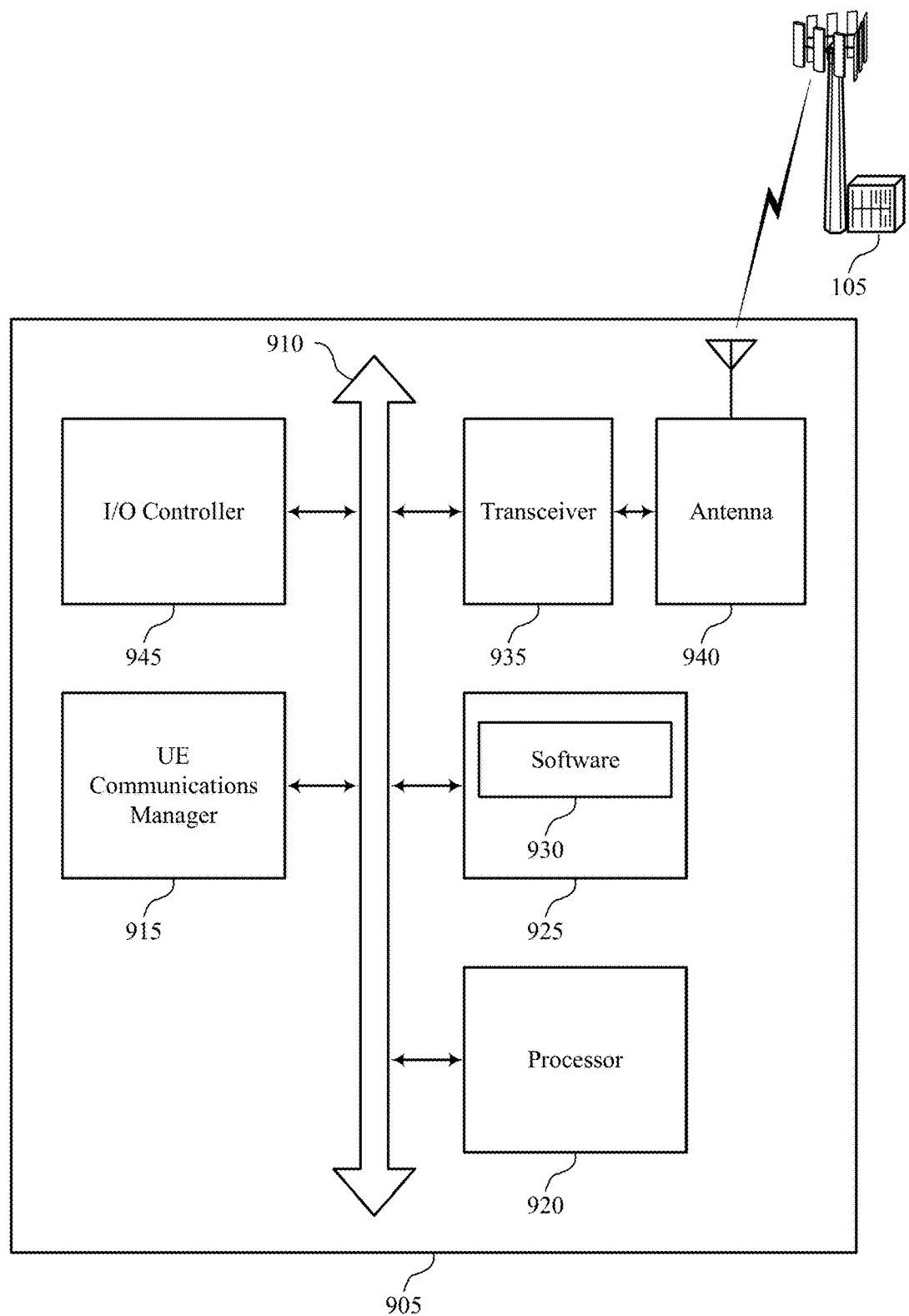
FIG. 9 illustrates a block diagram of a system including a device that supports post-puncture indication for MBB and low latency communication multiplexing in accordance with various aspects of the present disclosure.

FIG. 9 shows a diagram of a system 900 including a device 905 that supports post-puncture indication for MBB and low latency communication multiplexing in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting post-puncture indication for MBB and low latency communication multiplexing).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support post-puncture indication for MBB and low latency communication multiplexing. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
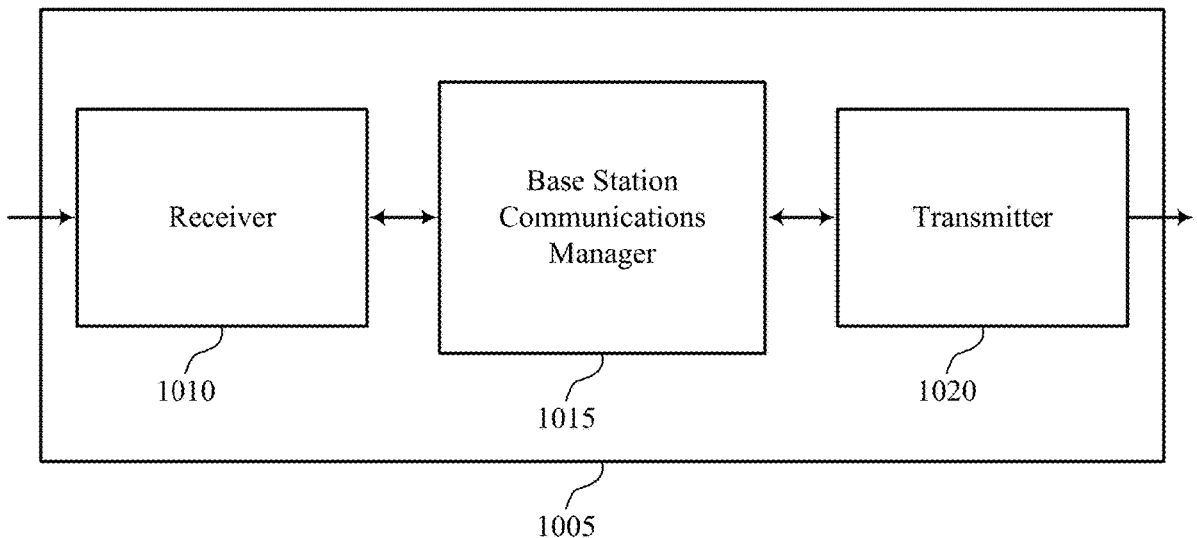
FIGS. 10 through 12 show block diagrams of a device or devices that support post-puncture indication for MBB and low latency communication multiplexing in accordance with various aspects of the present disclosure.

FIG. 10 shows a block diagram 1000 of a wireless device 1005 that supports post-puncture indication for MBB and low latency communication multiplexing in accordance with various aspects of the present disclosure. Wireless device 1005 may be an example of aspects of a base station 105 as described with reference to FIG. 1. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to post-puncture indication for MBB and low latency communication multiplexing, etc.). Information may be passed on to other components of the device. The receiver 1010 may be an example of aspects of the transceiver 1335 described with reference to FIG. 13.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit data on resources of a set of resources allocated for MBB communications and transmit a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
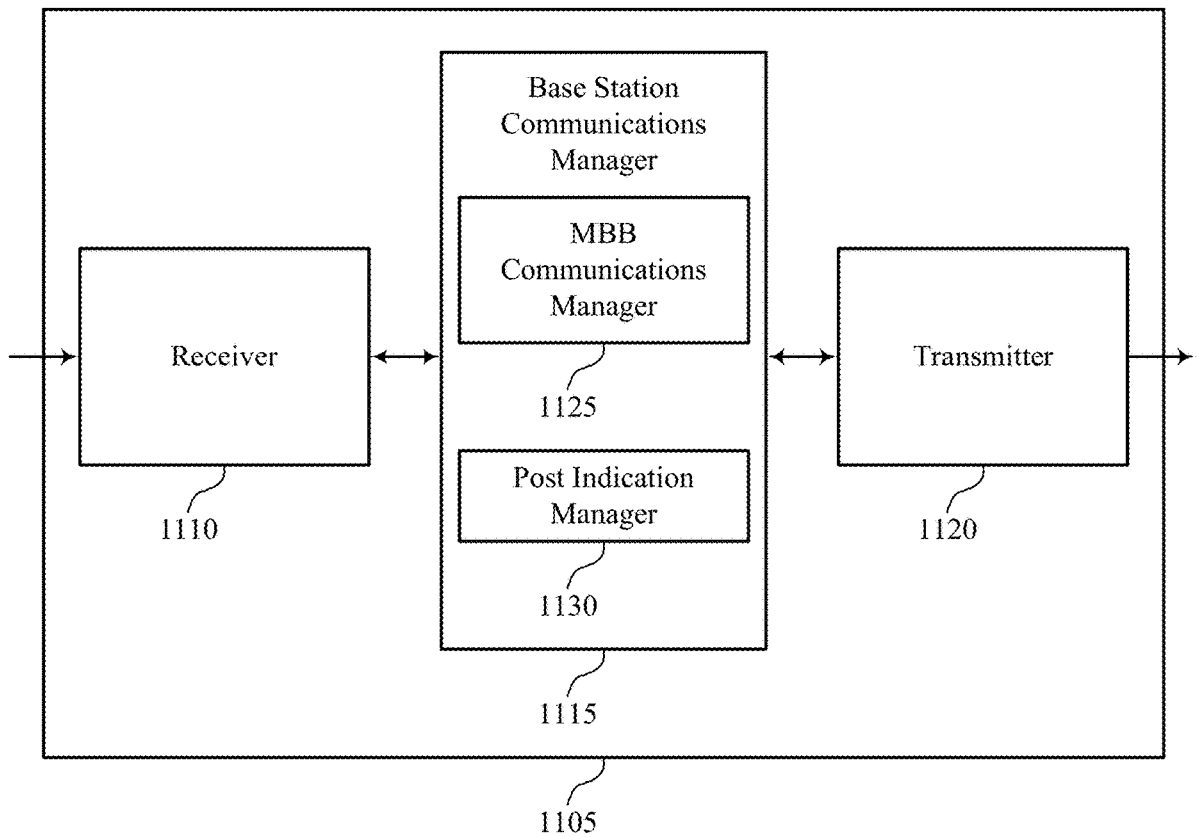

FIG. 11 shows a block diagram 1100 of a wireless device 1105 that supports post-puncture indication for MBB and low latency communication multiplexing in accordance with various aspects of the present disclosure. Wireless device 1105 may be an example of aspects of a wireless device 1005 or a base station 105 as described with reference to FIGS. 1 and 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to post-puncture indication for MBB and low latency communication multiplexing, etc.). Information may be passed on to other components of the device. The receiver 1110 may be an example of aspects of the transceiver 1335 described with reference to FIG. 13.

Base station communications manager 1115 may be an example of aspects of the base station communications manager 1315 described with reference to FIG. 13. Base station communications manager 1115 may include MBB communications manager 1125 and post indication manager 1130.

MBB communications manager 1125 may transmit data on resources of a set of resources allocated for MBB communications. Post indication manager 1130 may transmit a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration. In some cases, MBB communications manager 1125 may transmit a first transport block mapped to the resources punctured during the prior TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
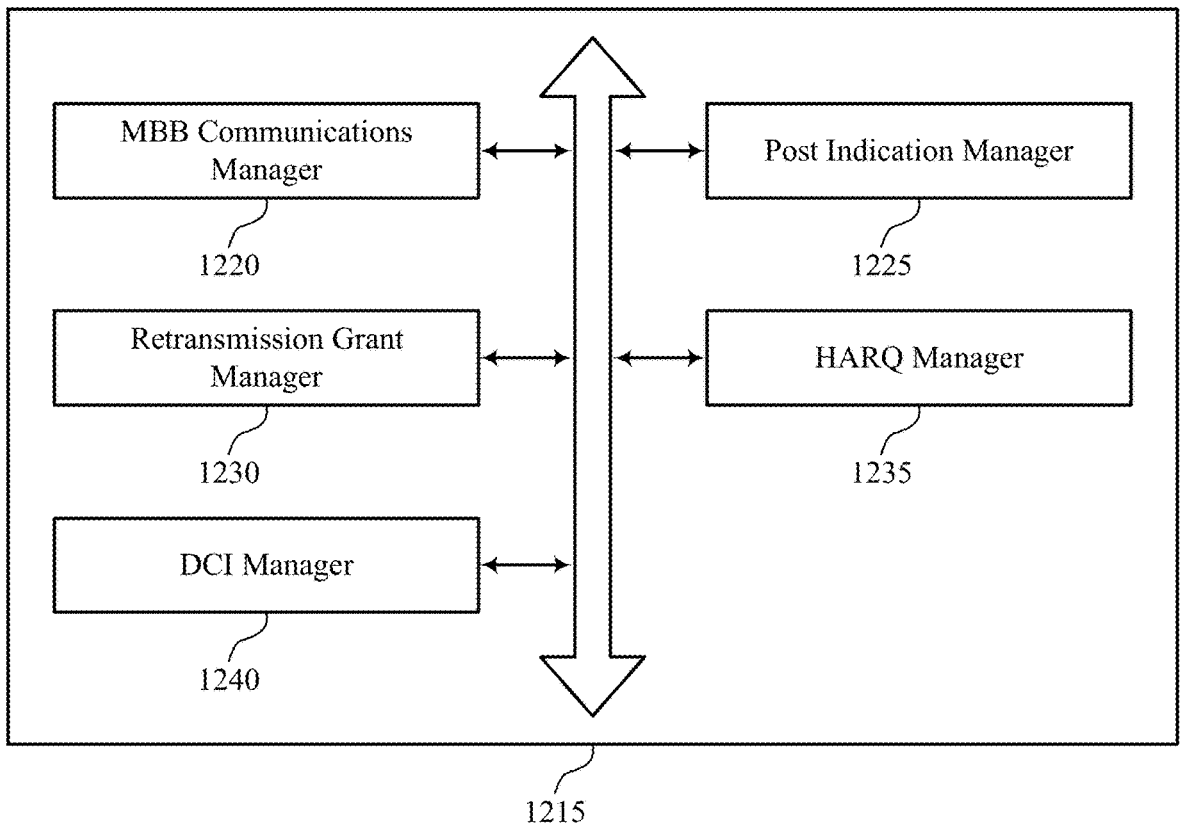

FIG. 12 shows a block diagram 1200 of a base station communications manager 1215 that supports post-puncture indication for MBB and low latency communication multiplexing in accordance with various aspects of the present disclosure. The base station communications manager 1215 may be an example of aspects of a base station communications manager 1315 described with reference to FIGS. 10, 11, and 13. The base station communications manager 1215 may include MBB communications manager 1220, post indication manager 1225, retransmission grant manager 1230, HARQ manager 1235, and DCI manager 1240. Each of these modules may communicate, directly or indirectly, with one another (e.g., via one or more buses).

MBB communications manager 1220 may transmit data on resources of a set of resources allocated for MBB communications. Post indication manager 1225 may transmit a control message that indicates a reassignment of resources of the set of resources, where the control message is transmitted in a control region of a TTI of a first duration and indicates reassigned resources of a prior TTI of the first duration, and where the reassigned resources are allocated for another type of communications having TTIs of a second duration that is shorter than the first duration. In some cases, MBB communications manager 1220 may transmit a first transport block mapped to the resources punctured during the prior TTI.

Retransmission grant manager 1230 may identify a retransmission grant that indicates the reassignment of resources of the set of resources. In some cases, the control message includes a retransmission grant and an indication of resources punctured during the prior TTI having the first duration. HARQ manager 1235 may receive a NAK associated with the first transport block and transmit a second transport block that includes a redundancy version of the first transport block based on receiving the NAK.

DCI manager 1240 may identify DCI that indicates the reassignment of resources of the set of resources. In some cases, the control message includes first DCI that indicates resources punctured during the prior TTI having the first duration. In some cases, DCI manager 1240 may transmit second DCI that indicates an assignment of uplink or downlink resources. In some cases, a first number of decoding candidates for the first DCI is less than a second number of decoding candidates for the second DCI. In some cases, a set of decoding candidates for the first DCI are defined by one or more aggregation levels that are based on a link condition. In some cases, DCI manager 1240 may transmit RRC signaling that indicates the one or more aggregation levels for the first DCI.

Figure 13:
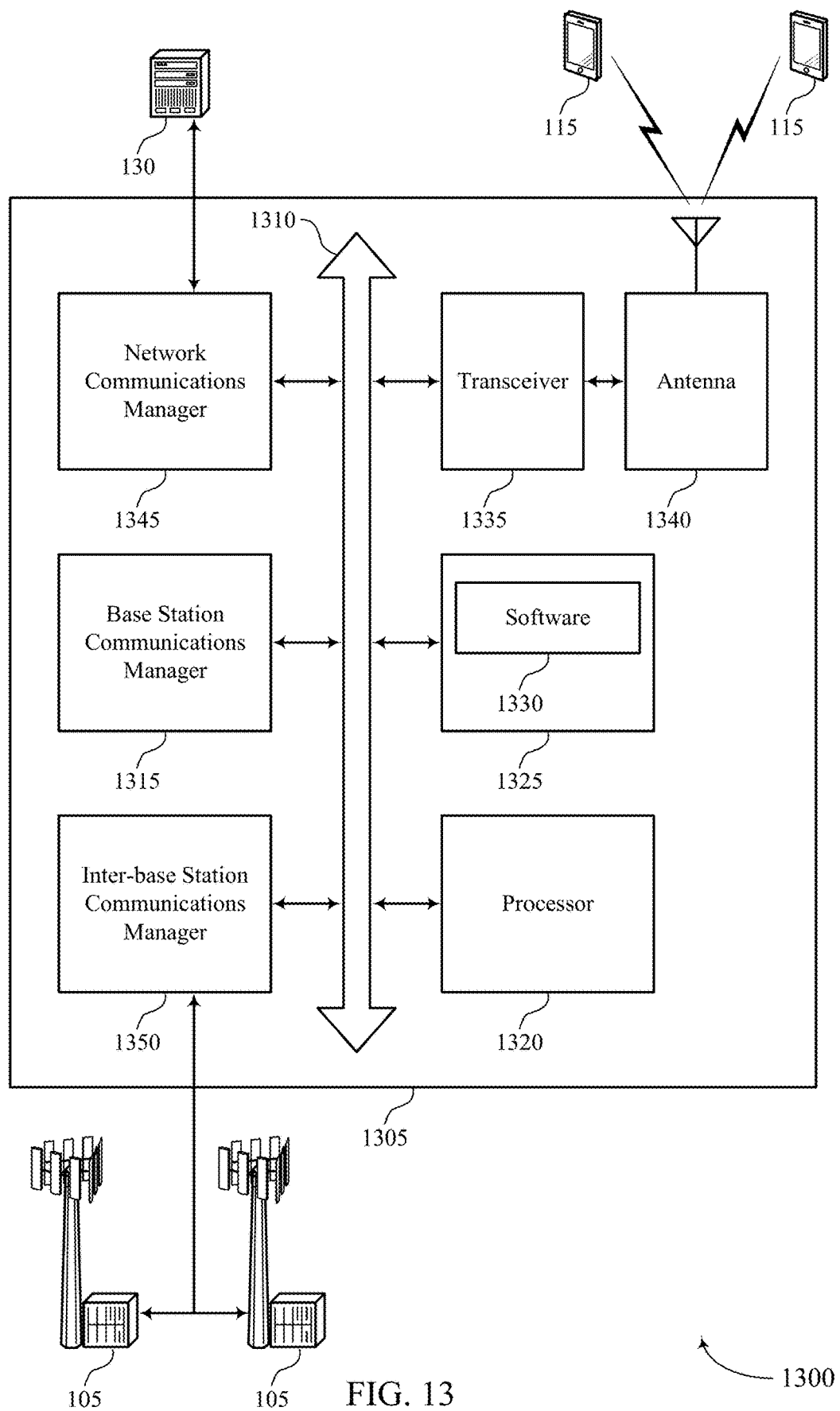
FIG. 13 illustrates a block diagram of a system including a device, such as a base station, that supports post-puncture indication for MBB and low latency communication multiplexing in accordance with various aspects of the present disclosure.

FIG. 13 shows a diagram of a system 1300 including a device 1305 that supports post-puncture indication for MBB and low latency communication multiplexing in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-base station communications manager 1350. These components may be in electronic communication via one or more busses (e.g., bus 1310). Device 1305 may communicate wirelessly with one or more UEs 115.

Base station communications manager 1315 may manage communications with other base station 105, and may include a controller or scheduler for controlling communications with UEs 115 in cooperation with other base stations 105. For example, the base station communications manager 1315 may coordinate scheduling for transmissions to UEs 115 for various interference mitigation techniques such as beamforming or joint transmission. In some examples, base station communications manager 1315 may provide an X2 interface within an LTE/LTE-A wireless communication network technology to provide communication between base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting post-puncture indication for MBB and low latency communication multiplexing).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support post-puncture indication for MBB and low latency communication multiplexing. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-base station communications manager 1350 may manage communications with other base station 105, and may include a controller or scheduler for controlling communications with UEs 115 in cooperation with other base stations 105. For example, the inter-base station communications manager 1350 may coordinate scheduling for transmissions to UEs 115 for various interference mitigation techniques such as beamforming or joint transmission. In some examples, inter-base station communications manager 1350 may provide an X2 interface within an LTE/LTE-A wireless communication network technology to provide communication between base stations 105.

Figure 14:
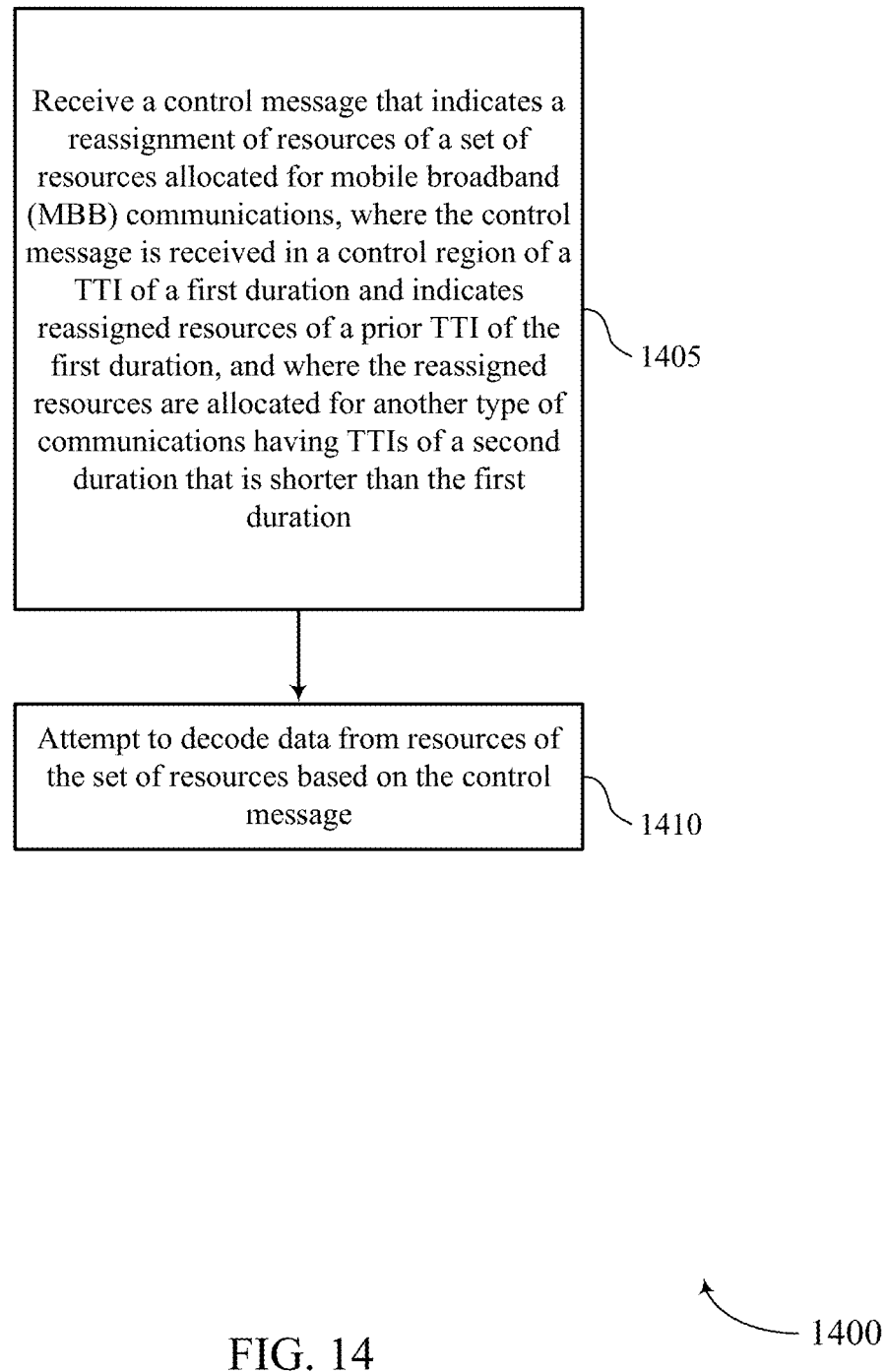
FIGS. 14 through 15 illustrate methods for post-puncture indication for MBB and low latency communication multiplexing in accordance with various aspects of the present disclosure.

FIG. 14 shows a flowchart illustrating a method 1400 for post-puncture indication for MBB and low latency communication multiplexing in accordance with various aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a control message that indicates a reassignment of resources of a set of resources allocated for MBB communications, wherein the control message is received in a control region of a TTI of a first duration and indicates reassigned resources of a prior TTI of the first duration, and wherein the reassigned resources are allocated for another type of communications having TTIs of a second duration that is shorter than the first duration. The operations of block 1405 may be performed according to the methods described with reference to FIGS. 1 through 5. In certain examples, aspects of the operations of block 1405 may be performed by a post indication manager as described with reference to FIGS. 6 through 9.

At block 1410 the UE 115 may attempt to decode data from resources of the set of resources based at least in part on the control message. The operations of block 1410 may be performed according to the methods described with reference to FIGS. 1 through 5. In certain examples, aspects of the operations of block 1410 may be performed by a decoder as described with reference to FIGS. 6 through 9.

Figure 15:
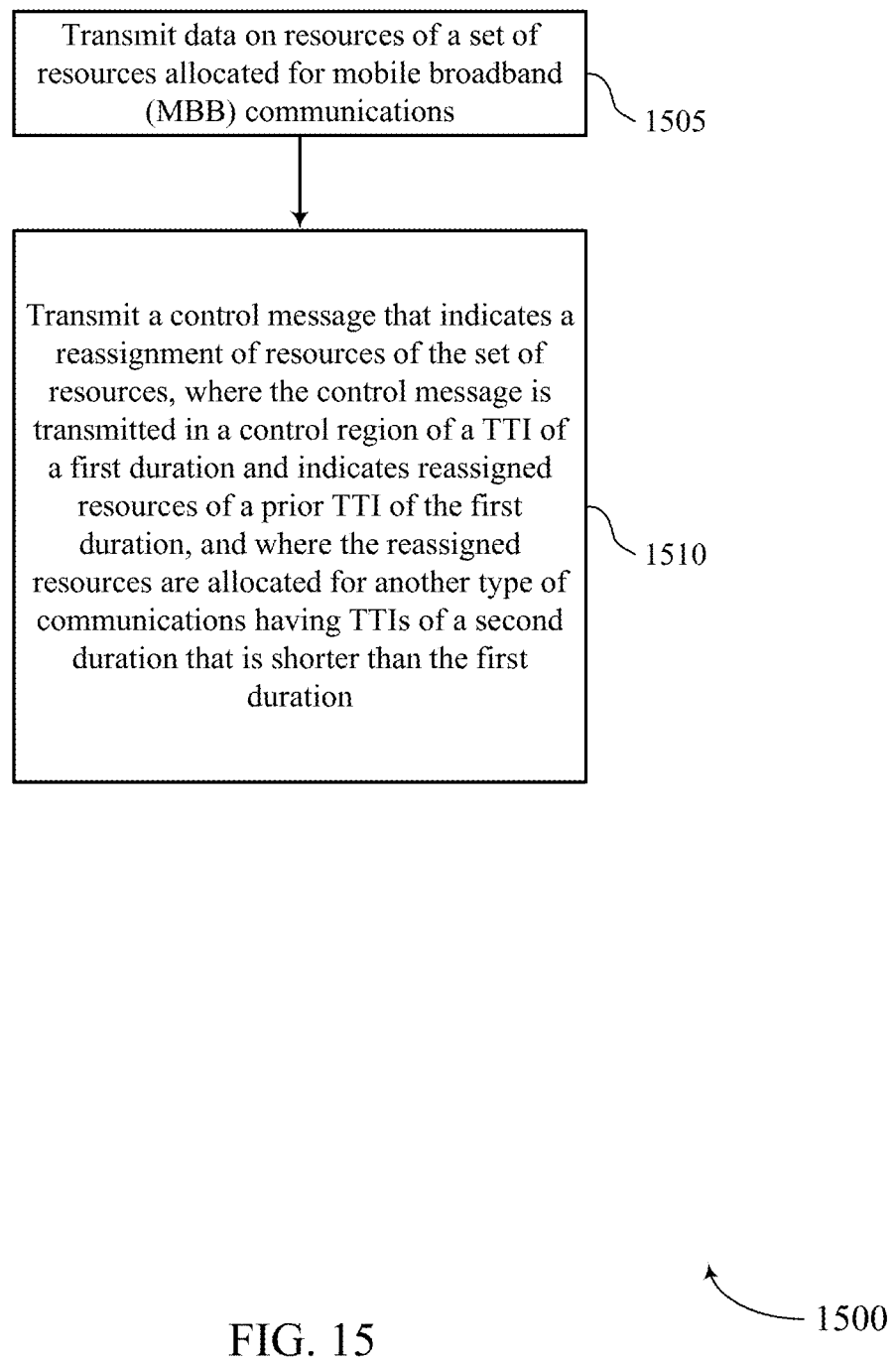

FIG. 15 shows a flowchart illustrating a method 1500 for post-puncture indication for MBB and low latency communication multiplexing in accordance with various aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit data on resources of a set of resources allocated for MBB communications. The operations of block 1505 may be performed according to the methods described with reference to FIGS. 1 through 5. In certain examples, aspects of the operations of block 1505 may be performed by a MBB communications manager as described with reference to FIGS. 10 through 13.

At block 1510 the base station 105 may transmit a control message that indicates a reassignment of resources of the set of resources, wherein the control message is transmitted in a control region of a TTI of a first duration and indicates reassigned resources of a prior TTI of the first duration, and wherein the reassigned resources are allocated for another type of communications having TTIs of a second duration that is shorter than the first duration. The operations of block 1510 may be performed according to the methods described with reference to FIGS. 1 through 5. In certain examples, aspects of the operations of block 1510 may be performed by a post indication manager as described with reference to FIGS. 10 through 13.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method for wireless communication, comprising:
identifying a sub-band of a system bandwidth associated with a set of resources allocated for communications that are subject to preemption;
monitoring a control region for control messages corresponding to the sub-band of the system bandwidth associated with the set of resources that are subject to preemption, wherein the control messages comprise a first downlink control information (DCI) and a second DCI;
receiving the first DCI based at least in part on the monitoring, wherein the first DCI indicates a preemption of resources of the set of resources in a prior transmission time interval (TTI), and wherein a first quantity of decoding candidates for the first DCI is less than a second quantity number of decoding candidates for the second DCI; and
attempting to decode data from the set of resources in the prior TTI based at least in part on the first DCI.

2. The method of claim 1, further comprising:
refraining from decoding preempted resources of the prior TTI based at least in part on the first DCI.

3. The method of claim 1, wherein a set of decoding candidates for the first DCI is defined by one or more aggregation levels that are based at least in part on a link condition.

4. The method of claim 3, further comprising:
receiving radio resource control (RRC) signaling that indicates the one or more aggregation levels for the first DCI.

5. The method of claim 1, wherein the first DCI comprises a retransmission grant and an indication of the resources preempted during the prior TTI.

6. The method of claim 5, further comprising:
identifying a failed decode attempt of a first transport block mapped to the resources preempted during the prior TTI; and
transmitting a negative acknowledgement (NAK) based at least in part on the failed decode attempt of the first transport block, wherein the first DCI is responsive to the NAK.

7. The method of claim 6, further comprising:
receiving a second transport block that comprises a redundancy version of the first transport block based at least in part on the retransmission grant; and
combining information from the first transport block and information from the second transport block, wherein the combining is based at least in part on the indication of the resources preempted during the prior TTI.

8. The method of claim 5, further comprising:
resetting a decoding hypothesis based at least in part on the indication of the resources preempted during the prior TTI, and combining information from a set of transport blocks based at least in part on the reset decoding hypothesis.

9. The method of claim 1, further comprising:
determining that a modulation order used for communicating during the prior TTI is greater than a threshold; wherein monitoring the control region for the first DCI is based at least in part on the determination.

10. The method of claim 1, further comprising:
determining that a coding rate used for communicating during the prior TTI is greater than a threshold; wherein monitoring the control region for the first DCI is based at least in part on the determination.

11. The method of claim 1, further comprising:
determining that a quantity of spatial layers or a rank of transmission used for communicating during the prior TTI is greater than a threshold; wherein monitoring the control region for the first DCI is based at least in part on the determination.

12. A method for wireless communication, comprising:
transmitting data via a set of resources allocated for communications;
transmitting an indication that a sub-band of a system bandwidth associated with the set of resources is subject to preemption for another type of communications different from the communications;
transmitting a first downlink control information (DCI) in a control region based at least in part on the sub-band of the system bandwidth being subject to preemption, wherein the first DCI indicates a preemption of resources of the set of resources in a prior transmission time interval (TTI); and
transmitting a second DCI, wherein a first quantity of decoding candidates for the first DCI is less than a second quantity of decoding candidates for the second DCI.

13. The method of claim 12, wherein a set of decoding candidates for the first DCI is defined by one or more aggregation levels that are based at least in part on a link condition.

14. The method of claim 13, wherein the second DCI indicates an assignment of uplink or downlink resources.

15. The method of claim 13, further comprising:
transmitting radio resource control (RRC) signaling that indicates the one or more aggregation levels for the first DCI.

16. The method of claim 12, wherein the first DCI comprises a retransmission grant and an indication of the resources preempted during the prior TTI.

17. The method of claim 16, wherein transmitting the data via the set of resources allocated for communications comprises:
transmitting a first transport block mapped to the resources preempted during the prior TTI.

18. The method of claim 17, further comprising:
receiving a negative acknowledgement (NAK) associated with the first transport block; and
transmitting a second transport block that comprises a redundancy version of the first transport block based at least in part on receiving the NAK.

19. An apparatus for wireless communication, comprising:
a processor;
memory in electronic communication with the processor; and
instructions stored in the memory, wherein the instructions are executable by the processor to:
identify a sub-band of a system bandwidth associated with a set of resources allocated for communications that are subject to preemption;
monitor a control region for control messages corresponding to the sub-band of the system bandwidth associated with the set of resources that are subject to preemption, wherein the control messages comprise a first downlink control information (DCI) and a second DCI;
receive the first DCI based at least in part on the monitoring, wherein the first DCI indicates a preemption of resources of the set of resources in a prior transmission time interval (TTI), and wherein a first quantity of decoding candidates for the first DCI is less than a second quantity of decoding candidates for the second DCI; and
attempt to decode data from the set of resources in the prior TTI based at least in part on the first DCI.

20. The apparatus of claim 19, wherein the instructions are further executable by the processor to:
refrain from decoding preempted resources of the prior TTI based at least in part on the first DCI.

21. The apparatus of claim 19, wherein a set of decoding candidates for the first DCI is defined by one or more aggregation levels that are based at least in part on a link condition.

22. The apparatus of claim 21, wherein the instructions are further executable by the processor to:
receive radio resource control (RRC) signaling that indicates the one or more aggregation levels for the first DCI.

23. The apparatus of claim 19, wherein the first DCI comprises a retransmission grant and an indication of the resources preempted during the prior TTI.

24. The apparatus of claim 23, wherein the instructions are further executable by the processor to:
identify a failed decode attempt of a first transport block mapped to the resources preempted during the prior TTI; and
transmit a negative acknowledgement (NAK) based at least in part on the failed decode attempt of the first transport block, wherein the first DCI is responsive to the NAK.

25. The apparatus of claim 24, wherein the instructions are further executable by the processor to:
receive a second transport block that comprises a redundancy version of the first transport block based at least in part on the retransmission grant; and
combine information from the first transport block and information from the second transport block, wherein the combining is based at least in part on the indication of the resources preempted during the prior TTI.

26. The apparatus of claim 23, wherein the instructions are further executable by the processor to:
reset a decoding hypothesis based at least in part on the indication of the resources preempted during the prior TTI, and combining information from a set of transport blocks based at least in part on the reset decoding hypothesis.

27. The apparatus of claim 19, wherein the instructions are further executable by the processor to:
determine that a modulation order used for communicating during the prior TTI is greater than a threshold; wherein monitoring the control region for the first DCI is based at least in part on the determination.

28. An apparatus for wireless communication, in a system comprising:
a processor;
memory in electronic communication with the processor; and
instructions stored in the memory, wherein the instructions are executable by the processor to:
transmit data via a set of resources allocated for communications;
transmit an indication that a sub-band of a system bandwidth associated with the set of resources is subject to preemption for another type of communications different from the MBB communications;
transmit a first downlink control information (DCI) in a control region based at least in part on the sub-band of the system bandwidth being subject to preemption, wherein the first DCI indicates a preemption of resources of the set of resources in a prior transmission time interval (TTI); and
transmit a second DCI, wherein a first quantity of decoding candidates for the first DCI is less than a second quantity of decoding candidates for the second DCI.

* * * * *